United States Patent [19]

Devchoudhury

[11] Patent Number: 4,513,389
[45] Date of Patent: Apr. 23, 1985

[54] ROM SECURITY CIRCUIT

[75] Inventor: Rathindra N. Devchoudhury, Ithaca, N.Y.

[73] Assignee: NCR Corporation, Dayton, Ohio

[21] Appl. No.: 320,790

[22] Filed: Nov. 12, 1981

[51] Int. Cl.³ .......................... G06F 13/00; G06F 7/00
[52] U.S. Cl. .................................................. 364/900
[58] Field of Search ...................... 364/200, 900, 706; 365/104, 189

[56] References Cited

U.S. PATENT DOCUMENTS

| | | | |
|---|---|---|---|
| 3,736,569 | 5/1973 | Bouricius et al. | 364/200 |
| 4,089,052 | 5/1978 | Gruner | 364/200 |
| 4,124,893 | 11/1978 | Joyce et al. | 364/200 |
| 4,139,893 | 2/1979 | Doland | 364/706 |
| 4,268,911 | 5/1981 | Bell | 365/104 |
| 4,332,009 | 5/1982 | Gerson | 364/200 |
| 4,384,326 | 5/1983 | Devchoudhury | 364/200 |

*Primary Examiner*—Eddie P. Chan
*Assistant Examiner*—Daniel K. Dorsey
*Attorney, Agent, or Firm*—J. T. Cavender; Wilbert Hawk, Jr.; Richard W. Lavin

[57] ABSTRACT

A control circuit to disable the operation of a semiconductor microprocessor memory device in the event of an unauthorized attempt to access the memory. A logic circuit generates a control signal in response to receiving a predetermined binary bit pattern of a plurality of chip select signals. The control signal enables the memory device for operation. If the binary bit pattern is not presented, the memory device is disabled for operation.

15 Claims, 6 Drawing Figures

ROM SECURITY CIRCUIT

BACKGROUND OF THE INVENTION

The present invention relates to a unique security control circuit for preventing the unauthorized use of a semiconductor memory incorporated within a microprocessor unit. Presently there is a need to protect programs and data stored in memory devices of data processing equipment from being read by unauthorized persons. With increasing emphasis towards software programs, the need to protect such programs also increases. Once a program or other data has been stored in a memory device, it is very easy for one to remove the memory device and copy the program from the memory device using well known circuits. Thus it is the primary object of this invention to provide a semiconductor memory unit which requires the entrance into the memory unit of a predetermined sequence of data characters before the memory unit can be accessed. It is a further object of this invention to provide a control circuit located within the semiconductor memory unit for enabling the memory unit upon receiving a predetermined sequence of data characters. It is another object of this invention to provide such a control circuit which is simple in construction and low in cost.

SUMMARY OF THE INVENTION

In order to fulfill these objects there is disclosed a read-only memory (ROM) unit which includes a control circuit coupled to the chip select lines of the memory unit. After a power-up condition has occurred, a plurality of AND gates located in the control circuit receives a predetermined binary bit pattern of the chip select signal enabling the AND gates to sequentially gate a first control signal to a plurality of serially connected flip-flops. Upon receiving the proper binary bit pattern, the flip-flops are enabled in successive operation to output a control signal which enables the memory unit to be operated by the chip select signals. If the proper bit pattern is not received, the flip-flops are reset disabling the memory unit for operation.

BRIEF DESCRIPTION OF THE DRAWINGS

Additional advantages and features of the present invention will become apparent and fully understood from a reading of the following description, taken together with the annexed drawings.

DESCRIPTION OF THE PREFERRED EMBODIMENT

Figure 1:
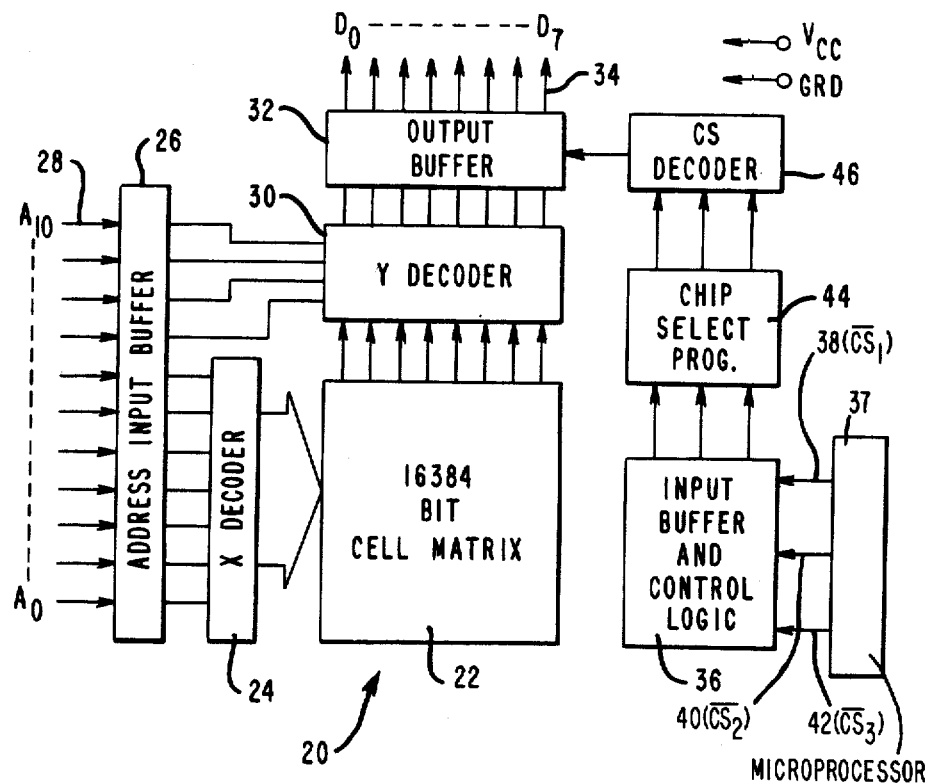
FIG. 1 is a block diagram of a standard ROM memory unit showing the chip-select lines coupled to the input buffer and control logic unit in which is located the control circuit for enabling the operation of the memory unit.

Referring now to FIG. 1, there is shown a block diagram of a ROM memory unit generally indicated by the numeral 20 which includes the present invention. An example of a conventional ROM memory unit that is presently commercially available is the Intel 2316E manufactured by the Intel Corporation of Santa Clara, Calif. Included in the memory unit 20 is a 16384 bit cell matrix 22 to which is coupled a decoder 24 which decodes the address bits $A_0$–$A_6$ inclusive transmitted over lines 28 and received from the address input buffer 26. The address bits $A_7$–$A_{10}$ inclusive transmitted over the lines 28 are inputted into a decoder 30 which decodes the data read out of the matrix 22. The decoded data bits $D_0$–$D_7$ are outputted to the output buffer 32 for transmission over lines 34 to a receiving unit.

Further included in the ROM memory unit 20 is an input buffer and control logic unit 36 which receives from a microprocessor 37 associated with the ROM memory unit the active low chip select signals $\overline{CS_1}$, $\overline{CS_2}$ and the active high chip select signal $CS_3$ over lines 38, 40 and 42 for transmission to a chip select program unit 44 which selects the chip to be accessed in accordance with a program stored in the unit. A description of the INTEL 2316E ROM memory unit and the chip select signals $CS_1$, $CS_2$ and $CS_3$ required to operate the ROM may be found in the publication "INTEL Data Catalog 1977" published by the INTEL Corporation, 1977. The chip select signals outputted from the program unit 44 are transferred to a chip select decoder 46 which controls the operation of the output buffer 32 to output the required data over lines 34 to the receiving unit.

Figure 3:
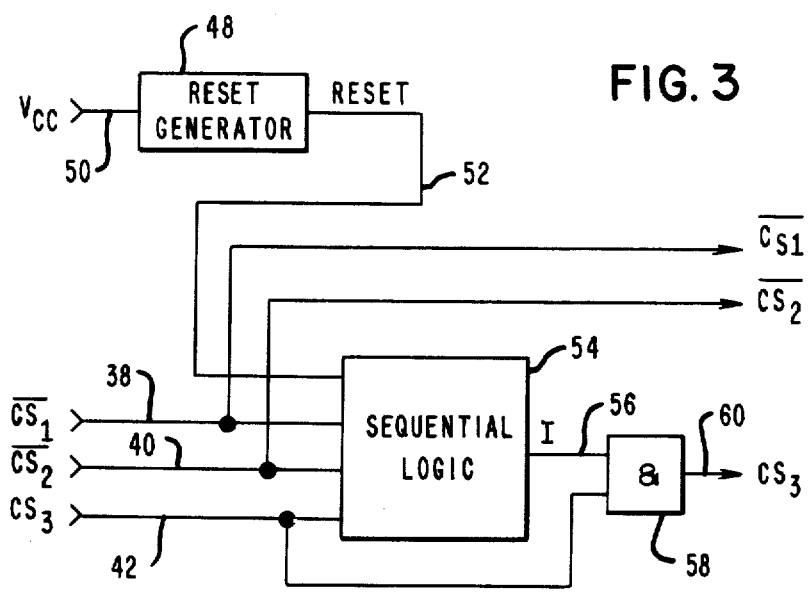
FIG. 3 is a block diagram of the control circuit located in the input buffer and control logic of the ROM memory unit for controlling the operation of the memory unit.

Referring now to FIG. 3, there is shown a block diagram of the control logic circuit located in the input buffer unit 36 (FIG. 1) of the ROM memory unit 20, which will enable the memory unit upon receiving a predetermined bit pattern of the chip select signals $\overline{CS_1}$, $\overline{CS_2}$ and $CS_3$. Included in this circuit is a reset generator 48 which receives over line 50 the chip power supply voltage signal $V_{CC}$. The generator 48 will output the signal RESET (FIG. 4b) upon the signal $V_{CC}$ (FIG. 4a) going high over line 52 to a sequential logic circuit 54 which receives over the lines 38, 40 and 42 the chip select signals $\overline{CS_1}$, $\overline{CS_2}$ and $CS_3$ respectively.

Figure 4:
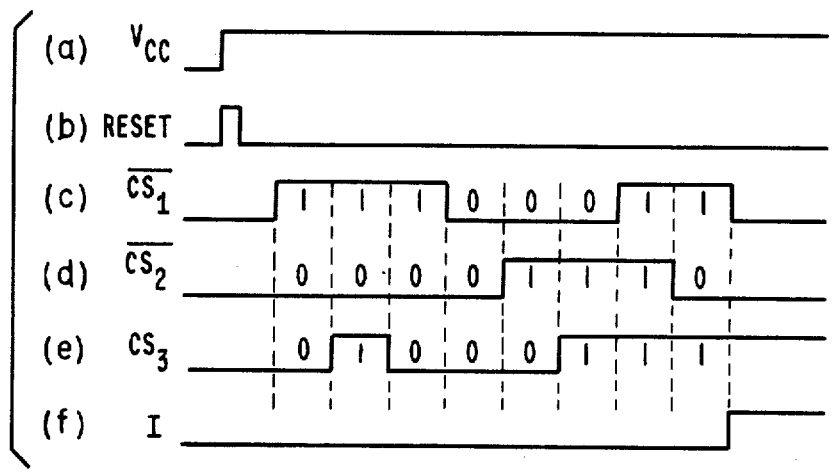
FIG. 4 is a diagram showing the chip select signals which enable the ROM memory unit for operation.

In accordance with the present invention, the chip select signals $\overline{CS_1}$, $\overline{CS_2}$ and $CS_3$ are required to exhibit the predetermined bit pattern before the ROM memory unit 20 can be enabled. In the present example, the signals $\overline{CS_1}$, $\overline{CS_2}$ and $CS_3$ are required to have a first predetermined bit pattern of 0, 0 and 1 respectively to enable the ROM memory unit for operation. Prior to the generation of this bit pattern, such chip select signals are required to exhibit a second predetermined bit pattern which in the present embodiment is a 8-bit sequence. As shown in FIG. 4c, the chip select signal $\overline{CS_1}$ is required to exhibit the bit pattern 1, 1, 1, 0, 0, 0, 1 and 1. In a similar manner, the signal $\overline{CS_2}$ (FIG. 4d) must exhibit the bit pattern 0, 0, 0, 0, 1, 1, 1 and 0 while the signal $CS_3$ (FIG. 4e) is required to exhibit the pattern 0, 1, 0, 0, 0, 1, 1 and 1. If the second predetermined bit pattern of the chip select signals has been generated, the sequential logic circuit 54 (FIG. 3) will output the active high signal I (FIG. 4f) over line 56 to an AND gate 58 enabling the AND gate to gate the next $CS_3$ signal appearing on line 42 over line 60 to the chip select program unit 44 enabling the decoder 46 to control the buffer 32 to output data over lines 34 upon the generation of the first predetermined bit pattern of the chip select signals $\overline{CS_1}$, $\overline{CS_2}$ and $CS_3$ appearing on lines 38, 40 and 60 respectively (FIG. 3).

Figure 5:
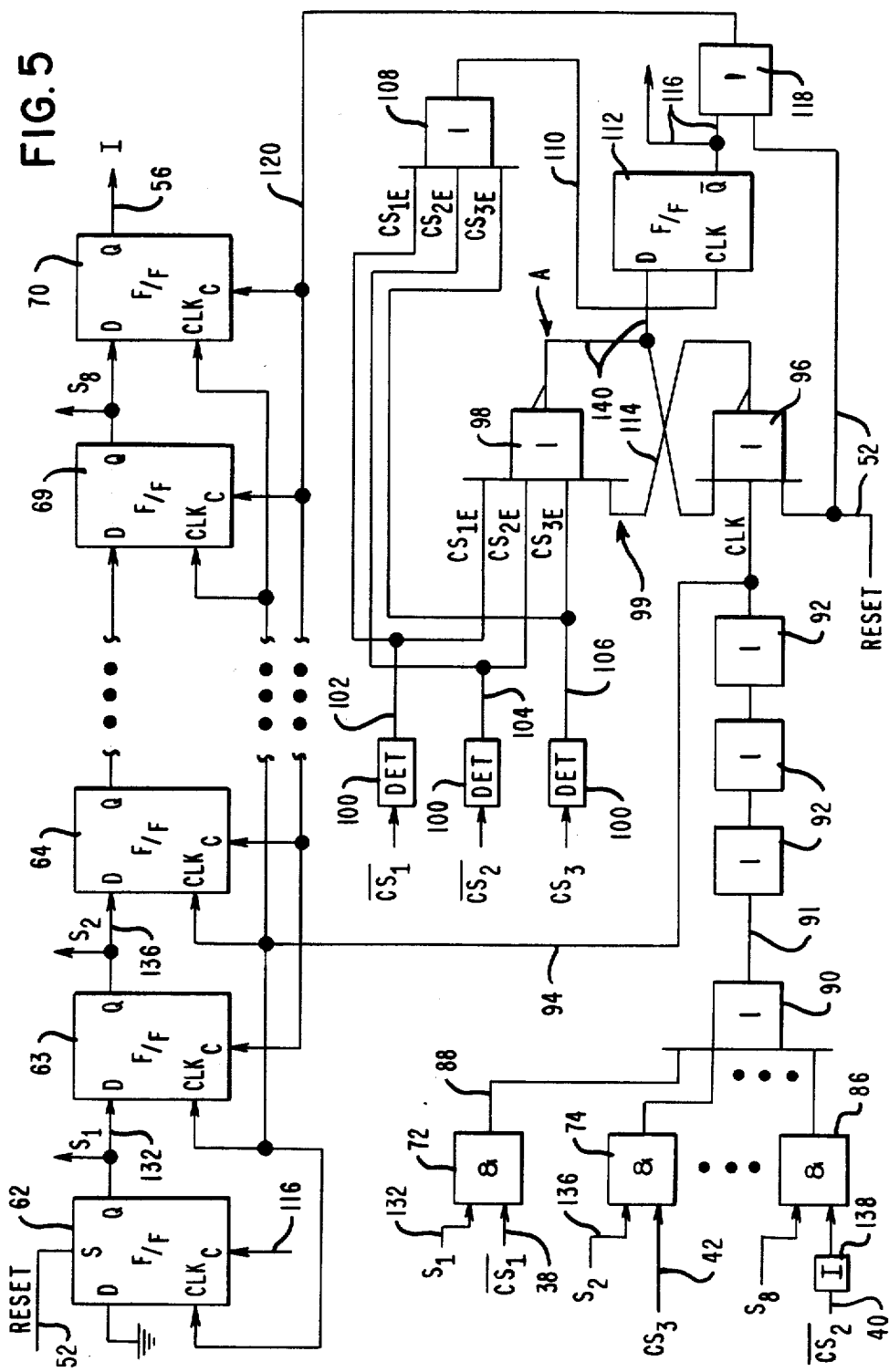
FIG. 5 is a block diagram of the sequential logic circuit of the control circuit of FIG. 3.

Referring now to FIG. 5, there is shown a block diagram of the sequential logic circuit 54 (FIG. 3) for checking the second predetermined bit pattern of the chip select signals. Included in the circuit is a plurality of D-type flip-flops 62–70 inclusive, the number of flip-flops corresponding to the number of binary bits in the bit pattern of each of the chip select signals plus one. Further included in the logic circuit is a plurality of AND gates 72–86 inclusive, each receiving the output signal S of one of the flip-flops 62–69 inclusive. The other input of each of the AND gates 72–86 inclusive receives one of the chip select signals $\overline{CS_1}$, $\overline{CS_2}$ and $CS_3$. The output signal S of the flip-flops 62–69 inclusive sequentially enables one of the AND gates 72–86 inclusive to gate one of the chip select signals which in turn enables the next flip-flop to clock the output signal S. If this selected pattern of the chip select signals is correct, the last flip-flop 70 will be clocked to output the high signal I (FIG. 4f) over line 56 enabling the AND gate 58 (FIG. 3) to output the chip select signal $CS_3$ over line 60 resulting in the ROM unit 20 entering an operating mode. An inverter gate 138 is employed to present the proper level of the chip select signals to the AND gates 72–81 inclusive.

As shown in FIG. 5, each of the AND gates 72–86 inclusive is connected over line 88 to an OR gate 90 whose output line 91 is connected to a delay circuit comprising a plurality of non-inverting gates 92. The output line 94 of the last gate 92 is connected to the clock input of the flip-flops 62–70 inclusive. The output line 94 of the gates 92 is also connected to one input of a NOR gate 96 which together with a second NOR gate 98 forms a latch circuit generally indicated by the numeral 99 for use in disabling the ROM memory unit 20 when the required bit pattern of the chip select signals is not presented.

The NOR gate 98 (FIG. 5) receives the signals $CS_{1E}$ (FIG. 6c), $CS_{2E}$ and $CS_{3E}$ (FIG. 6d) which are pulses generated by edge detector circuits 100 receiving the chip select signals $\overline{CS_1}$, $\overline{CS_2}$ and $CS_3$. The signals $CS_{1E}$–$CS_{3E}$ inclusive appearing on lines 102, 104 and 106, respectively, are also inputted into an OR gate 108 whose output line 110 is connected to the clock input of a D-type flip-flop 112 which also receives at its D input the output signal of the NOR gate 98 over line 140. The output signal of the flip-flop 112 is inputted over line 116 to the clear input of the flip-flop 62 and to one input of an OR gate 118 which outputs a clear signal over line 120 to the clear inputs of the flip-flops 63–70 inclusive. The OR gate 118 also receives the signal RESET (FIG. 4b) over line 52. As will be described more fully hereinafter, the flip-flops 62–70 inclusive will be cleared whenever the chip select signals $\overline{CS_1}$, $\overline{CS_2}$ and $CS_3$ do not present the proper bit patterns.

Figure 2:
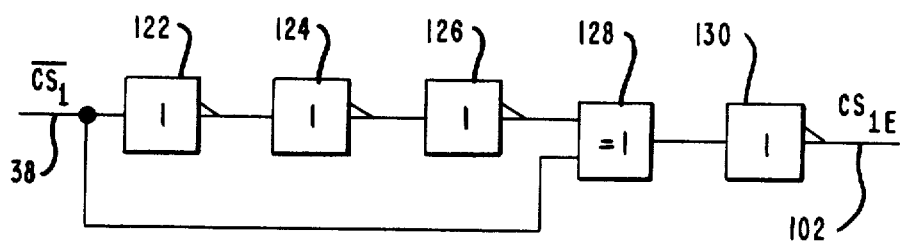
FIG. 2 is a block diagram of an edge detect circuit for generating control signals used in controlling the operation of the ROM memory unit.

Referring to FIG. 2, there is shown a block diagram of the edge detector circuit 100 (FIG. 5) for chip select signal $CS_1$ which includes inverter circuit gates 122, 124 and 126 and an Exclusive OR gate 128 which receives the output signal of the inverter circuit 126 and the chip select signal $CS_1$ appearing on line 38. The output signal of the Exclusive OR gate 128 is inverted by the inverter circuit gate 130 whose output signal $CS_{1E}$ is inputted into the NOR gate 98 and the OR gate 108 (FIG. 5) as previously described. Similar circuit arrangements are provided for each of the chip select signals $\overline{CS_2}$ and $CS_3$.

Figure 6:
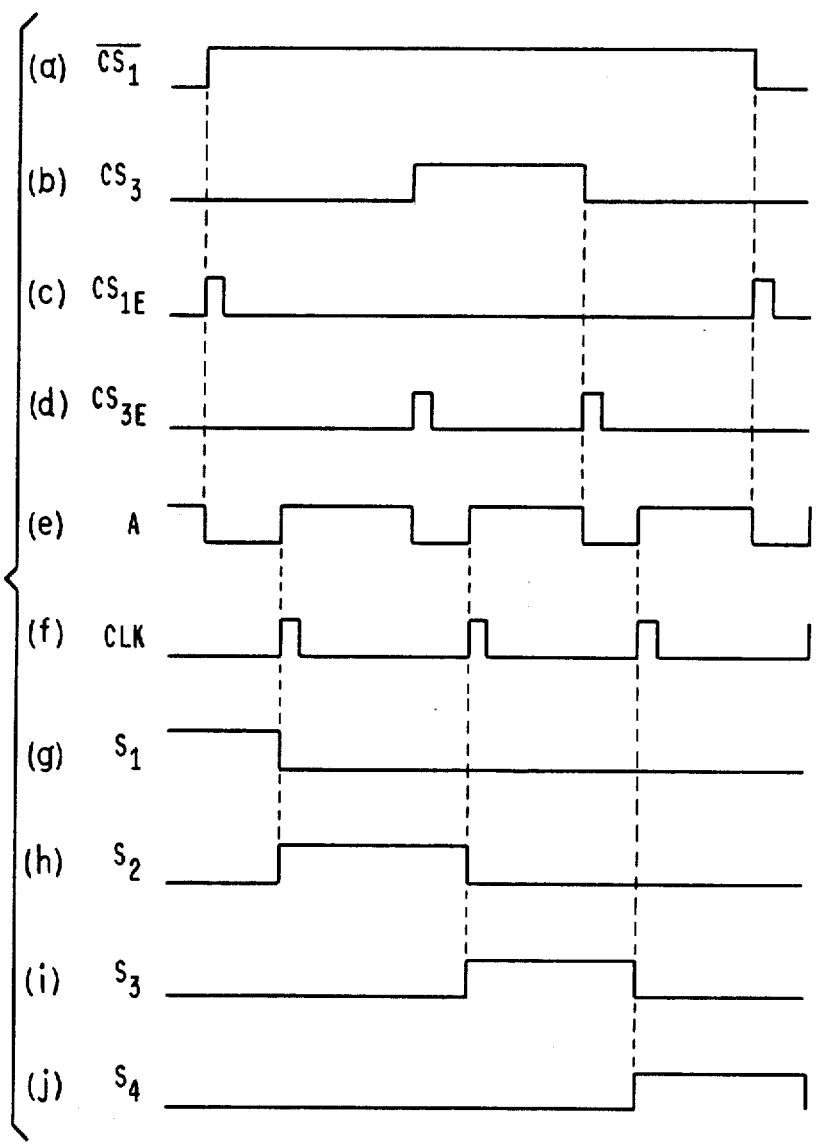
FIG. 6 is a diagram of the control signals generated in the operation of the sequential logic circuit.

In the operation of the memory unit 20, once the power signal $V_{CC}$ reaches a power-up level (FIG. 4a), the reset generator 48 (FIG. 3) will output the high signal RESET (FIG. 4b) over line 52 which resets the latch circuit 99 and also clears the flip-flops 63–70 (FIG. 5) inclusive by the appearance of the signal RESET on the output line 120 of the OR gate 118. The RESET signal also sets the flip-flop 62 which outputs a high signal S1 (FIG. 6g) over line 132 conditioning the AND gate 72 to output the chip select signal $\overline{CS_1}$ appearing on its other input line 38. If the proper bit sequence is presented, the chip select signal $\overline{CS_1}$ (FIGS. 4c and 6a) will be high, which is gated by the AND gate 72 over line 88 through the OR gate 90 and the inverter gates 92 which will then appear on line 94 as the clock signal CLK (FIG. 6f). The signal CLK will be inputted into the clock inputs of the flip-flops 62–70 inclusive clocking the flip-flops. Since at this time the D input of the flip-flop 63 is receiving the high signal S1, the clocking of the flip-flop results in the appearance on the Q output of the flip-flop 63 the high signal S2 (FIG. 6h) which is inputted over line 136 into the next AND gate 74. Upon the inputting of the next set of chip select signals $\overline{CS_1}$, $\overline{CS_2}$ and $CS_3$ (FIGS. 4c–4e), the chip select signal $CS_3$ is selected to be inputted into the AND gate 74. A second clock signal (FIG. 6f) is generated upon the signal $CS_3$ (FIGS. 4e and 6b) going high resulting in the clocking of the next flip-flop 64. It will be seen from this construction that if the proper bit pattern of the chip select signals are inputted into the circuit, each of the flip-flops 63–70 inclusive will be sequentially clocked by the signal CLK until the flip-flop 70 will output the signal I over line 56 enabling the AND gate 58 (FIG. 3) to output the next chip select signal $CS_3$ allowing the ROM memory unit 20 to be accessed by the address data bits $A_0$–$A_{10}$ (FIG. 1) in a manner that is well-known in the art.

The signal CLK is also inputted into the NOR gate 96 of the latch 99 whose output signal is inputted into the NOR gate 98 (FIG. 5). When the signal RESET (FIG. 4b) goes high, the NOR gate 96 will output a low signal which is transmitted over line 114 to the NOR gate 98. Upon the changing of any of the chip select signals, the corresponding signals $CS_{1E}$–$CS_{3E}$ inclusive will go high resulting in the output signal of the NOR gate 98 appearing at point A (FIGS. 5 and 6e) going low. This signal is transmitted over line 140 to the NOR gate 96. Upon the signal CLK going high, the NOR gate 96 will output a low signal over line 114 to the NOR gate 98 whose output signal appearing at point A will go high. If the signal CLK is low, indicating the bit pattern of the chip select signals is not valid, the signal appearing at point A (FIGS. 5 and 6e) will remain low until the chip select signals again change state. Any time the chip select signals $\overline{CS_1}$, $\overline{CS_2}$ and $CS_3$ inclusive change state, the corresponding signals $CS_{1E}$–$CS_{3E}$ inclusive (FIGS. 6c and 6d) inputted into the OR gate 108 (FIG. 5) will go high enabling the gate 108 to output a high signal over line 110 to the clock input of the flip-flop 112. It will be seen from this arrangement that the Q output signal of the flip-flop 112 remains low as long as the proper bit patterns are maintained on the chip select signals. If at any time the proper bit pattern is not presented, the Q output signal of the flip-flop 112 appearing on line 116 will go high resulting in the clearing of flip-flop 62 and in the OR gate 118 outputting a high signal over line 120 and thereby also clearing the flip-flops 63–70 inclusive. The flip-flops 63–70 inclusive will remain in this reset condition until the power signal $V_{CC}$ goes from low to high during a power up condition which removes the reset condition of the circuit, thereby enabling the circuit to start another memory enabling operation.

While the invention has been particularly shown and described with reference to a preferred embodiment thereof, it will be understood by those skilled in the art that various changes in forms and details may be made therein without departing from the spirit and scope of the invention. Hence, applicants desire their invention to be not limited beyond the scope as required by the appended claims.

I claim:

1. In a data processing system including a memory device and a processing device for outputting a plurality of memory enabling signals each of which has a predetermined voltage level required for enabling the operation of the memory device, a circuit for initiating the operation of the memory device including:
   a plurality of serially-connected first logic circuit members each of which, when operated, outputs a first control signal enabling the succeeding first logic circuit member to be operated;
   a second logic member connected to the last operated first logic circuit member and enabled upon receiving said first control signal for outputting a second control signal when operated;
   first logic circuit means connected to each of said first logic circuit members for receiving said memory enabling signals and said first control signal for outputting a third control signal to said first and second logic circuit members in response to said memory enabling signals having the required predetermined voltage level for sequentially operating said first and second logic circuit members;
   and means receiving one of said memory enabling signals and enabled by said second control signal to allow the received memory enabling signal to operate said memory device.

2. The circuit of claim 1 wherein each of said first logic circuit members comprises a switching member enabled by said third control signal to output said first control signal to the succeeding switching member and said first logic circuit means includes gating means enabled by the simultaneous occurrence of said first control signal and said one of said memory enabling signals to output said first and second third control signal to each of said switching members enabling said switching members for operation.

3. The circuit of claim 2 in which said gating means outputs a fourth control signal in response to said one of said memory enabling signals not having the required voltage level, said system further includes second logic circuit means connected to said switching members and operated in response to receiving said fourth control signal for disabling the operation of said switching members.

4. The circuit of claim 3 which further includes a power signal for supplying power to the memory device and a signal generating means receiving said power signal and connected to said switching members, said signal generating means generating a fifth control signal in response to receiving said power signal, thereby enabling said switching members for operation.

5. The circuit of claim 4 in which said second logic circuit means includes a latch member enabled by said fourth control signal to output a disabling signal which disables said switching members until the generation of said fifth control signal.

6. The circuit of claim 5 in which said latch member is enabled by said third control signal to output a sixth control signal enabling said switching members to output said first control signal.

7. The circuit of claim 5 in which each of said switching members comprises a bi-stable integrated circuit.

8. In a data processing system including a memory device and a processor for outputting a plurality of memory enabling signals each of which has a predetermined voltage level for enabling the operation of the memory device, a circuit for initiating the operation of the memory device including
   a plurality of serially-connected first switching members each of which, when operated, outputs a first control signal enabling the succeeding switching member to be operated;
   a second switching member connected to the last operated first switching member and enabled upon receiving said first control signal for outputting a second control signal when operated;
   logic circuit means including a plurality of first gating means connected to the output of said first switching members with each of the first gating means receiving one of said memory enabling signals and said first control signal, each of said first gating means outputting a third control signal to said first and second switching members in response to receiving the memory enabling signals having the required predetermined voltage level for sequentially operating said first and second switching members wherein the second switching member outputs said second control signal;
   and second gating means receiving one of said memory enabling signals and connected to said memory device and the last operated switching member, said second gating means enabled by said second signal to output the memory enabling signal to said memory device enabling the operation of said memory device.

9. The circuit of claim 8 in which said second gating means outputs a third control signal in response to the memory enabling signals not having the proper predetermined signal level, said system further includes second logic circuit means connected to the output of said first gating means and operated in response to receiving said third control signal for disabling the operation of said switching members.

10. The circuit of claim 9 which further includes a power signal for supplying power to the memory device and a signal generating means receiving said power signal, said signal generating means connected to said switching members and enabled by said power signal to output a fourth control signal, thereby enabling the operation of said switching members.

11. The circuit of claim 10 in which said second logic circuit means includes latching means connected to said first gating means and enabled by said second and third control signals to output said second and third control signals and a bi-stable device connected to the output of said latching means and said switching members, said bi-stable device outputting a fifth control signal to said switching members in response to recieving said third control signal thereby disabling the operation of said switching members.

12. The circuit of claim 11 in which said switching members and said bi-stable device comprises a flip-flop logic circuit.

13. The circuit of claim 12 which further includes a plurality of edge detecting circuits connected to said bi-stable device, each of said edge-detecting circuits receiving one of said memory enabling signals to output an operating signal to said bi-stable device upon detecting a change in the signal level of said memory enabling signals whereby said bi-stable device is operated to control the operation of said switching members.

14. A method for preventing the unauthorized operation of a memory device comprising the steps of:
   generating a plurality of memory enabling signals each having a predetermined signal level required for operating the memory device;
   inputting each of the memory enabling signals and a second control signal into a plurality of gating members;
   sequentially operating each of the gating members to generate a first control signal in response to the memory enabling signals inputted into the gating members having the required signal level for operating the memory device;
   sequentially operating a plurality of serially connected first switching members in response to the generation of said first control signal in which each of said first switching members will output said second control signal when operated;
   operating one of said gating members and the succeeding first switching member in response to the generation of said second control signal;
   operating a second switching member connected to the last operated first switching member in response to the generation of said first and second control signals;
   generating a third control signal upon the operation of the second switching member;
   and transferring one of said memory enabling signals to the memory device in response to the generation of said third control signal enabling the operation of the memory device.

15. The method of claim 14 which further includes the steps of:
   generating a fourth control control signal upon finding a non-valid signal level;
   and disabling the operation of the serially-connected first and second switching members in response to the generation of said fourth control signal.

* * * * *